(12) United States Patent
Horikoshi et al.

(10) Patent No.: US 9,063,294 B2
(45) Date of Patent: Jun. 23, 2015

(54) WAVELENGTH PLATE, POLARIZATION CONVERSION DEVICE USING THE SAME, ILLUMINATION OPTICAL SYSTEM, AND IMAGE DISPLAY APPARATUS

(75) Inventors: Ryoko Horikoshi, Kanagawa (JP); Yuichi Takahashi, Shanghai (CN); Koji Kita, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 462 days.

(21) Appl. No.: 13/374,916

(22) Filed: Jan. 23, 2012

(65) Prior Publication Data

US 2012/0194768 A1 Aug. 2, 2012

(30) Foreign Application Priority Data

Jan. 30, 2011 (CN) .......................... 2011 1 0032266

(51) Int. Cl.
| | |
|---|---|
| *G02F 1/1335* | (2006.01) |
| *G02B 5/30* | (2006.01) |
| *G02B 27/09* | (2006.01) |
| *G02B 27/28* | (2006.01) |
| *G03B 21/20* | (2006.01) |
| *H04N 9/31* | (2006.01) |
| *G02B 27/10* | (2006.01) |

(52) U.S. Cl.
CPC .......... *G02B 5/3083* (2013.01); *G02B 27/0905* (2013.01); *G02B 27/0961* (2013.01); *G02B 27/1046* (2013.01); *G02B 27/285* (2013.01); *G03B 21/2073* (2013.01); *H04N 9/3167* (2013.01)

(58) Field of Classification Search
CPC ............ G02F 1/13363; G02F 2413/02; G02F 1/133428; G02F 2001/133548; G02B 5/3083; G02B 5/1809; G02B 5/3025; G02B 27/283; G02B 27/286
USPC ......... 349/5–9, 117–121; 359/483.01–494.01
See application file for complete search history.

(56) References Cited

U.S. PATENT DOCUMENTS

| | | | | |
|---|---|---|---|---|
| 5,990,996 | A * | 11/1999 | Sharp ............................ | 349/119 |
| 6,947,215 | B2 * | 9/2005 | Hoshi ........................... | 359/576 |
| 2007/0139771 | A1* | 6/2007 | Wang et al. .................. | 359/494 |
| 2007/0291357 | A1* | 12/2007 | Oto ............................... | 359/485 |
| 2010/0026918 | A1* | 2/2010 | Nakagawa et al. ............... | 349/5 |

FOREIGN PATENT DOCUMENTS

| | | |
|---|---|---|
| JP | 2003-302523 | 10/2003 |
| JP | 2007-58018 | 3/2007 |
| JP | 4277514 | 3/2009 |
| JP | 4329852 | 6/2009 |
| JP | 2009-288262 | 12/2009 |
| JP | 2010-8827 | 1/2010 |

* cited by examiner

*Primary Examiner* — Edward Glick
*Assistant Examiner* — David Chung
(74) *Attorney, Agent, or Firm* — Frommer Lawrence & Haug LLP; William S. Frommer

(57) ABSTRACT

A wavelength plate includes: a first quartz plate unit including a plurality of quartz plates which have main surfaces disposed in the same plane and are jointed with each other; and a second quartz plate unit including a plurality of quartz plates which have main surfaces disposed on a main surface of the first quartz plate unit and are jointed with each other in a position different from a joint position of the first quartz plate unit.

7 Claims, 6 Drawing Sheets

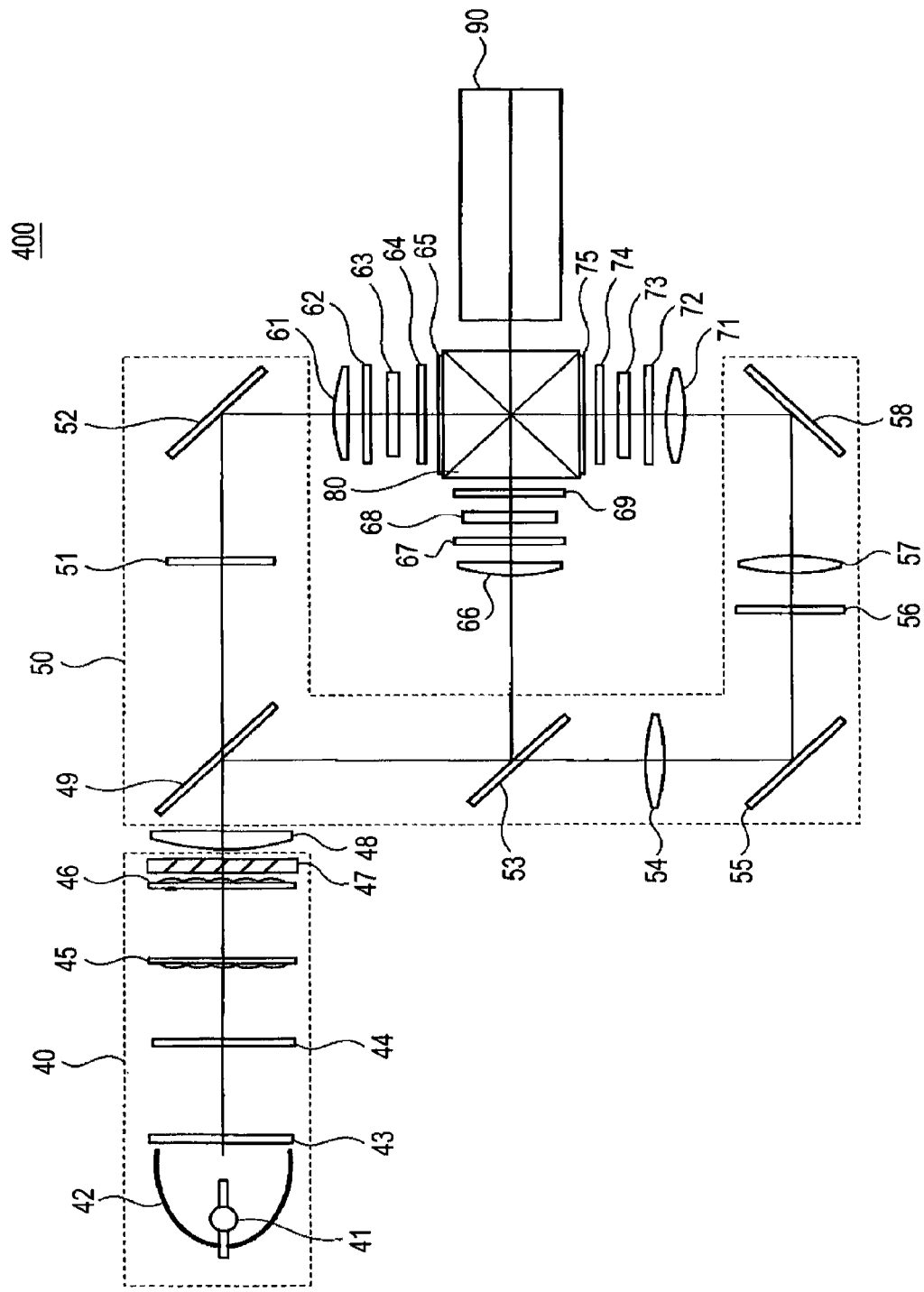

WAVELENGTH PLATE, POLARIZATION CONVERSION DEVICE USING THE SAME, ILLUMINATION OPTICAL SYSTEM, AND IMAGE DISPLAY APPARATUS

FIELD

The present disclosure relates to a wavelength plate which changes a polarization direction of light which passes through the wavelength plate, and a polarization conversion device using the same, an illumination optical system, and an image display apparatus.

BACKGROUND

In the related art, in a projection image display apparatus (projector), a polarization conversion device has been used to enhance light usage efficiency. In this polarization conversion device, a ½ wavelength plate is used to change a polarization direction of light.

With regard to the ½ wavelength plate having such a use, it is necessary to perform superior polarization conversion in the entire wavelengths in a visible region, and to this end, a broadband ½ wavelength plate is used.

Generally, a film made of polycarbonate or the like is used as material of the ½ wavelength plate, but this material is poor in heat resistance or weather resistance and easily deteriorates. Thus, for example, JP-A-2003-302523 discloses a technique which forms a ½ wavelength plate by superposing two sheets of quartz plates.

Further, Japanese Patent No. 4277514 discloses a technique which can form a broadband ½ wavelength plate by superposing two sheets of quartz plates so that their optical axes intersect each other at a predetermined angle.

By forming the ½ wavelength plate with the quartz plates, heat resistance or weather resistance of the wavelength plate is enhanced. However, this causes two problems.

The first problem is that when a polarization conversion device is assembled using the wavelength plate formed by the quartz plates, a problem occurs in heat resistance or weather resistance of the polarization conversion device.

In general, the polarization conversion device has a configuration in which the ½ wavelength plate is fixed onto a plurality of glass prisms which are arranged to form polarization beam splitters. If the ½ wavelength plate is attached onto the glass prisms using an adhesive, the ½ wavelength plate may be separated due to deterioration of the adhesive caused by the heat of the light which passes through the polarization conversion device, or due to the difference between the thermal expansion coefficients of glass and quartz.

In order to solve this problem, JP-A-2009-288262 discloses a technique in which an adhesive is disposed in a peripheral section of a polarization panel formed by glass prisms or the like, that is, in an area which does not transmit light and only the end parts of a ½ wavelength plate are adhesively fixed.

In this technique, since the adhesive is not present in an area which transmits light, deterioration such as separation of the fixed locations does not occur.

Further, in a polarization conversion device disclosed in Japanese Patent No. 4329852, the end parts of a phase difference plate (wavelength plate) are attached to plate glass by a double-sided tape. In this technique, the double-sided tape is not similarly present in an area which does not transmit light. In particular, in Japanese Patent No. 4329852, a minute clearance is formed between the plate glass and the phase difference plate due to the attachment of the double-sided tape, thereby making it possible to suppress occurrence of interference fringes.

The second problem is that it is difficult to provide a large-sized wavelength plate.

In order to manufacture a wavelength plate, it is necessary to prepare a quartz plate suitable for the size of the wavelength plate. Since the quartz plate is formed by cutting a crystal ingot of quartz, a large crystal ingot should be prepared to obtain a large-sized quartz plate. It is difficult to prepare the large crystal ingot, and the cost becomes high even though the large crystal ingot can be prepared, which makes it difficult to provide a large-sized wavelength plate formed of the quartz plate. In this regard, in a polarization conversion device disclosed in JP-A-2007-58018, a plurality of divided quartz plates are positioned and attached to a transparent member to have a function of a single phase difference plate (wavelength plate), thereby providing a large-sized wavelength plate in a pseudo manner.

On the other hand, JP-A-2010-8827 discloses a technique in which the number of divided quartz plates is two. A single phase difference plate (wavelength plate) is formed by the two divided quartz plates.

A phase difference plate supporting member is disposed in a joint position of the two divided quartz plates, the quartz plates are pressed by the phase difference plate supporting member. Thus, the two divided quartz plates are fixed to a polarization splitting device (plate glass) as the single phase difference plate.

Further, both end parts of the phase difference plate formed by the two divided quartz plates are disposed in a peripheral section of the polarization splitting device, that is, in an area thereof which does not transmit light and are fixed to a frame section provided in the periphery of the polarization splitting device by a thermal caulking.

In the technique disclosed in JP-A-2007-58018, each of the plurality of divided quartz plates should be attached to the transparent member by an adhesive. A quartz plate disposed in a center area of the transparent member, in an area which transmits light, is also fixed to the transparent member by the adhesive. Thus, in a similar way to the above-described first problem, a problem may occur that the quartz plate disposed in such an area is easily separated due to deterioration of the adhesive caused by the heat of the light, or due to the difference between the thermal expansion coefficients of glass and quartz.

On the other hand, in the technique disclosed in JP-A-2010-8827, since the single phase difference plate is formed by the two divided quartz plates, a large-sized phase difference plate can be achieved. Further, since both end parts of the phase difference plate are fixed by the caulking, the problem of adhesive deterioration does not occur. Thus, the technique disclosed in JP-A-2010-8827 can solve the above-described two problems.

SUMMARY

However, in the technique disclosed in JP-A-2010-8827, a new member which is called a phase difference plate supporting member should be provided, which increases the number of components, thereby increasing its cost.

Further, since the phase difference plate supporting member is disposed on the quartz plates, a gap occurs between the phase difference plate supporting member and the polarization splitting device. That is, since it is difficult to directly fix the phase difference plate supporting member to the polarization splitting device, a frame section should be installed in the periphery of the polarization splitting device and the phase difference plate supporting member should be fixed to the frame section. Thus, a mechanical structure becomes complicated.

Accordingly, it is desirable to provide a wavelength plate which has heat resistance and is advantageous in a large size, a polarization conversion device including the same, an illumination optical system, and an image display apparatus.

An embodiment of the present disclosure is directed to a wavelength plate including: a first quartz plate unit including a plurality of quartz plates which have main surfaces disposed in the same plane and are jointed with each other.

The wavelength plate according to the embodiment of the present disclosure further includes a second quartz plate unit including a plurality of quartz plates which have main surfaces disposed on the main surface of the first quartz plate unit and are jointed with each other in a position different from a joint position of the first quartz plate unit.

Another embodiment of the present disclosure is directed to a polarization conversion device including: a polarization splitting device which splits incident light into p-polarized light and s-polarized light; and a wavelength plate which is disposed in an optical path of any one polarized light split by the polarization splitting device.

The wavelength plate of the above-described embodiment is used for the wavelength of this embodiment.

Still another embodiment of the present disclosure is directed to an illumination optical system including: a light source; an integrator device which reduces illuminance unevenness of light emitted from the light source; and a polarization conversion device which is disposed in an optical path of light which passes through the integrator device.

The polarization conversion device of the above-described embodiment is used for the polarization conversion device of this embodiment.

Yet another embodiment of the present disclosure is directed to an image display apparatus including: an illumination optical system; a spectroscopic optical system which disperses light emitted from the illumination optical system; a liquid crystal panel which modulates each dispersed light; a light synthesizing section which synthesizes the light modulated by the liquid crystal panel; and a lens which projects the light synthesized by the light synthesizing section.

The illumination optical system of the above-described embodiment is used for the illumination optical system of this embodiment.

According to the wavelength plate and the polarization conversion device, the illumination optical system and the image display apparatus using the same, the wavelength plate is configured by superposing two quartz plate units in which a plurality of quartz plates are jointed.

The joint positions of the quartz plates are different between the superposed two quartz plate units. Accordingly, the strength of the wavelength plate at the joint position can be improved.

According to the wavelength plate and the polarization conversion device, the illumination optical system and the image display apparatus using the same, the quartz plates are jointed while securing the strength at the joint position. Therefore, the wavelength plate can be enlarged easily without being provided with a member for supporting the joint position, and the wavelength plate can be manufactured at low cost.

BRIEF DESCRIPTION OF THE DRAWINGS

FIG. 9 is a diagram schematically illustrating a configuration of an image display apparatus according to a third embodiment of the present disclosure.

DETAILED DESCRIPTION

Description will be made in the following order.
1. First embodiment (wavelength plate and polarization conversion device using the same)
2. Second embodiment (illumination optical system)
3. Third embodiment (image display apparatus)

1. First Embodiment

Wavelength Plate and Polarization Conversion Device using the Same

Figure 1:
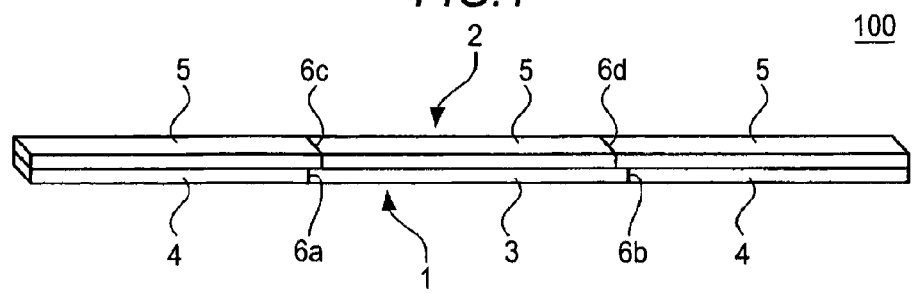
FIG. 1 is a perspective view schematically illustrating a configuration of a wavelength plate according to a first embodiment of the present disclosure.
Figure 2C:
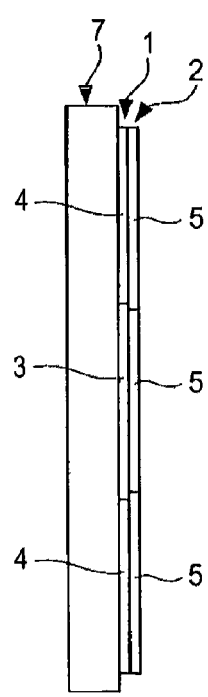
FIG. 2C is a schematic side view thereof.
Figure 2A:
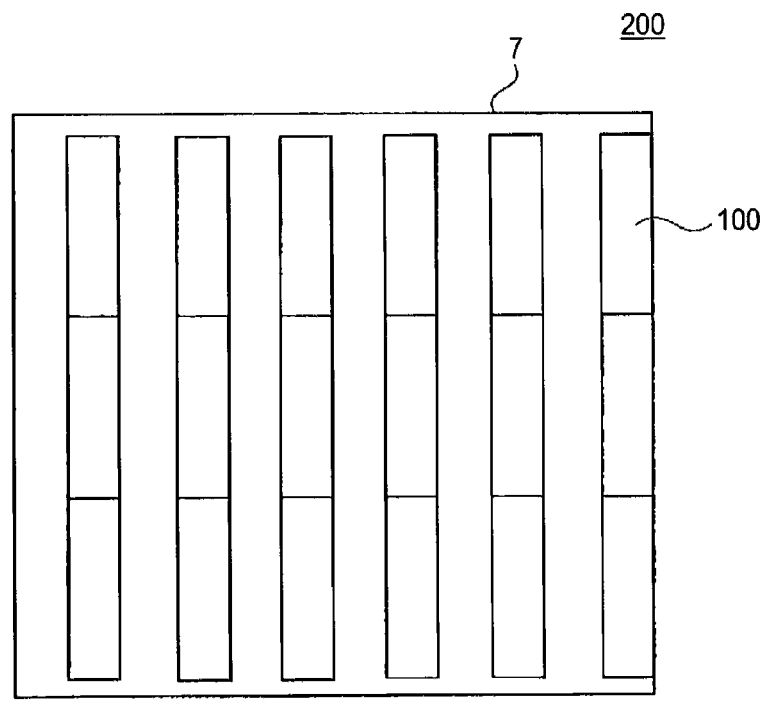
FIG. 2A is a top view schematically illustrating a polarization conversion device according to the first embodiment of the present disclosure.
Figure 2B:
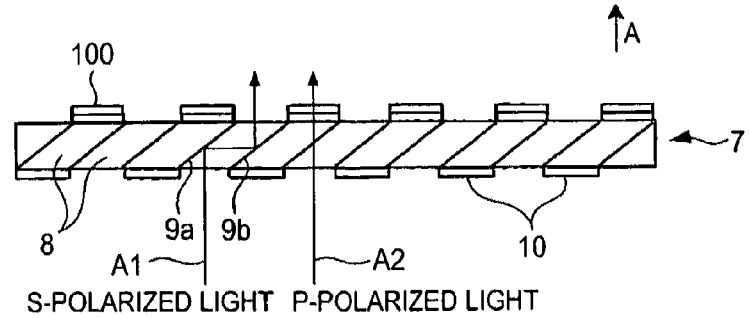
FIG. 2B is a schematic front view thereof.

FIG. 1 is a perspective view schematically illustrating a configuration of a wavelength plate 100 according to a first embodiment, and FIGS. 2A to 2C are diagrams schematically illustrating a configuration of a polarization conversion device using the wavelength plate 100.

The wavelength plate 100 according to the present embodiment includes a first quartz plate unit 1 which includes a plurality of jointed quartz plates, and a second quartz plate unit 2 which is disposed on the first quartz plate unit 1 and includes a plurality of jointed quartz plates.

In the present embodiment, the first quartz plate unit 1 includes a total of three quartz plates composed of a single quartz plate 3 having an approximately rectangular shape and two quartz plates 4 which are shorter in length than the quartz plate 3 in a length direction. Further, an anti-reflection film is formed on the main surface which is not in contact with the second quartz plate unit 2 among the main surfaces of the first quartz plate unit 1.

The length of the quartz plate 3 in a width direction is about 4 mm, for example, and the length thereof in the length direction is about 33 mm, for example. Further, the length of the quartz plate 4 in the width direction is about 4 mm, for example, and the length thereof in the length direction is about 27 mm, for example. Further, the thicknesses of the quartz plate 3 and the quartz plate 4 are 0.15 mm, for example.

The quartz plates 4 are disposed in opposite ends of the quartz plate 3 in the length direction, and are closely arranged in a line in the length direction. The quartz plate 3 and the quartz plates 4 are disposed so that respective main surfaces thereof are in the same plane. Contact surfaces in joints 6a and 6b of the quartz plate 3 and the quartz plates 4 may be fixed by an adhesive or the like, in accordance with the situation.

Further, the second quartz plate unit 2 includes three quartz plates 5 having an approximately rectangular shape. The length of the quartz plate 5 in the width direction is the same as those of the quartz plate 3 and the quartz plates 4, but the length thereof in the length direction is shorter than that of the quartz plate 3 and is longer than those of the quartz plates 4. The length of the quartz plate 5 in the width direction is 4 mm, for example, and the length thereof in the length direction is 29 mm. Further, the thickness of each quartz plate 5 is 0.15 mm, for example.

Further, an anti-reflection film is formed on the main surface which is not in contact with the first quartz plate unit 1 among the main surfaces of the second quartz plate unit 2.

Three quartz plates 5 are disposed on the main surface of the first quartz plate unit 1, and are closely arranged in a line in the length direction. Joints 6c and 6d of the adjacent quartz plates 5 may be fixed by an adhesive or the like.

Further, the second quartz plate unit 2 which includes three quartz plates 5 is attached to the main surface of the first quartz plate unit 1, using a light transmissive adhesive, ultraviolet light cured resin, or the like, for example.

The quartz plates 3, 4 and 5 are formed by inclinedly cutting an optical axis of quartz, that is, by so-called Z-cutting, for example, which can function as a zero-order ½ wavelength plate in one sheet of quartz plate.

The optical axis directions of the quartz plate 3 and the quartz plates 4 which form the first quartz plate unit 1 are the same. Further, the optical axis direction of the quartz plate 5 which forms the second quartz plate unit 2 is different from the optical axis directions of the quartz plate 3 and the quartz plates 4. By appropriately setting an intersection angle of the optical axes of the quartz plate 3 and the quartz plates 4 and the optical axis of each quartz plate 5, it is possible to adjust a wavelength band of light which can function as a ½ wavelength plate.

As shown in FIG. 1, in the wavelength plate 100 according to the present embodiment, positions of the joints 6a and 6b of the quartz plate 3 and the quartz plates 4 which form the first quartz plate unit 1 are different from positions of the joints 6c and 6d of the quartz plates 5 which form the second quartz plate unit 2.

That is, the joints 6a and 6b relating to the first quartz plate unit 1 do not coincide with and deviate from the joints 6c and 6d relating to the second quartz plate unit 2 in their positions in the normal direction of the main surfaces of the quartz plates 3 and 4 (quartz plate 5).

In the related art, since the wavelength plate obtained by jointing the plurality of quartz plates is weak in strength, a supporting member is installed in the joint positions of the quartz plates in order to solve this problem.

In the present embodiment, since adhesion of the first quartz plate unit 1 and the second quartz plate unit 2 is achieved between the same materials, an influence due to thermal expansion is small, so that they are firmly fixed. Further, as the positions of the joints 6a and 6c are different from each other, the joint 6a is supported by the quartz plate 5, and the joint 6c is supported by the quartz plate 3. The joint 6b is supported by the quartz plate 5 and the joint 6d is supported by the quartz plate 3.

In this way, by differentiating the positions of the joints 6a and 6b of the quartz plates 3 and 4 which form the first quartz plate unit 1 from the positions of the joints 6c and 6d of the quartz plates 5 which form the second quartz plate unit 2, it is possible to enhance the strengths in the respective joint positions. Thus, even though the plurality of quartz plates are jointed, they can be used as a single wavelength plate without newly installing the supporting member as in the related art, it is possible to easily achieve a large-sized wavelength plate and to reduce the cost.

Further, in the present embodiment, the second quartz plate unit 2 is configured by the quartz plates 5 having the same length, and the first quartz plate unit 1 is configured by the quartz plate 3 which is longer in length than the quartz plates 5 in the length direction and the quartz plates 4 which are shorter in length than the quartz plates 5 in the length direction.

In a case where the first quartz plate unit 1 and the second quartz plate unit 2 are formed by jointing three quartz plates, respectively, the lengths of the quartz plates are set as described above, and thus, it is possible to form the wavelength plate 100 only by three types of quartz plates having different lengths. Thus, it is possible to easily manufacture the wavelength plate 100.

FIGS. 2A to 2C are diagrams schematically illustrating a configuration of a polarization conversion device 200 which includes the wavelength plate 100. FIG. 2A is a plan view of the polarization conversion device 200, FIG. 2B is a diagram illustrating the polarization conversion device 200 when seen from an arrow A in FIG. 2A, and FIG. 2C is a diagram illustrating the polarization conversion device 200 when seen from an arrow B in FIG. 2A.

The polarization conversion device 200 according to the present embodiment includes a polarization splitting device 7 which splits incident light into pieces of polarized light in which polarization directions are perpendicular to each other, and a plurality of wavelength plates 100 which are disposed in an optical path of any one polarized light split by the polarization splitting device 7.

The polarization splitting device 7 is formed by attaching a plurality of prisms 8 of a parallelepiped shape, for example. For example, attached surfaces of the prisms 8 include a PBS surface 9a which reflects s-polarized light and transmits p-polarized light, and a reflection surface 9b which re-reflects the s-polarized light which is reflected by the PBS surface 9a, which are alternately formed.

Further, on a surface of each prism 8 from which the P-polarized light passed through the PBS surface 9a exits, the above-described wavelength plate 100 is disposed.

The wavelength plate 100 is fixed to the polarization splitting device 7 (prism 8) at opposite end parts thereof in the length direction, for example. As a fixing method, an adhesive may be used, or the wavelength plate 100 and the polarization splitting device 7 may be mechanically combined, which is not particularly limitative.

By fixing the opposite end parts of the wavelength plate 100 in the length direction to a periphery of the polarization splitting device 7, it is possible to suppress deterioration of adhesion due to light which passes through the polarization conversion device 200.

Further, in the prism 8 in which the wavelength plate 100 is installed on the light exiting surface, a light blocking plate 10 may be installed on a light incident surface.

As indicated by an arrow A1 in FIG. 2B, the s-polarized light incident to the polarization conversion device 200 according to the present embodiment is reflected by the PBS surface 9a of the prism 8 and is incident to the reflection surface 9b. Then, the s-polarized light is re-reflected by the reflection surface 9b and then exits as it is.

On the other hand, the p-polarized light incident to the polarization conversion device 200 according to the present embodiment passes through the PBS surface 9a of the prism 8 to be incident to the wavelength plate 100, as indicated by an arrow A2. Then, the p-polarized light incident to the wavelength plate 100 is changed in its polarization due to the generation of a phase difference (λ/2) of 180 degrees, and exits as s-polarized light.

As described above, in the wavelength plate 100 according to the present embodiment, since the joint positions of the quartz plates which form the first quartz plate unit 1 and the joint positions of the quartz plates which form the second quartz plate unit 2 are different from each other, high strength is secured in the respective joint positions compared with the related art.

Accordingly, it is possible to fix the wavelength plate 100 to the polarization splitting device 7 without installing the supporting member in the joint positions.

Thus, it is possible to manufacture the polarization conversion device 200 according to the present embodiment with low cost, and to easily achieve a large-sized polarization conversion device.

Further, in the polarization conversion device 200 according to the present embodiment, the opposite ends of the wavelength plate 100 in the length direction are fixed to the periphery of the polarization splitting device 7. Accordingly, even though the fixing of the wavelength plate 100 to the polarization splitting device 7 is performed by an adhesive, light is not incident to the adhesive. Thus, it is possible to prevent reduction of an adhesive force between the wavelength plate 100 and the polarization splitting device 7, to thereby secure heat resistance.

Particularly, as shown in FIG. 2C, in the wavelength plate 100, the first quartz plate unit 1 which includes the quartz plate 3 and the quartz plates 4 is fixed to the polarization splitting device 7.

The two quartz plates 4 which are disposed in opposite ends among the quartz plates which form the first quartz plate unit 1 are fixed to the polarization splitting device 7 in the end parts thereof. That is, since the quartz plates 4 are fixed to the periphery of the polarization splitting device 7, they are not affected by light passing therethrough, and thus, heat resistance is secured.

Further, since the fixing of the quartz plates 4 and the quartz plates 5 which are disposed on the quartz plates 4 is achieved between the same materials, deviation hardly occurs therebetween by thermal expansion, to thereby secure heat resistance.

Accordingly, the quartz plates 4 and the quartz plates 5 which are disposed on the quartz plates 4 are fixed to the polarization splitting device 7 in a state where heat resistance is secured.

On the other hand, the quartz plate 3 which is disposed between two quartz plates 4 is not directly fixed to the polarization splitting device 7. However, since opposite end parts thereof are fixed by the quartz plates 5 which are disposed on the quartz plates 4, the quartz plate 3 is not detached from the polarization splitting device 7 in the normal direction of the main surface. Further, the quartz plates 5 which are disposed on the quartz plate 3 are attached to the quartz plate 3 by an adhesive or the like, but the attachment is achieved between the same materials, and deviation hardly occurs therebetween by thermal expansion.

In this way, by disposing the side of the first quartz plate unit 1 in the polarization splitting device 7, it is possible to achieve more reliable fixing.

Here, the wavelength plate 100 is formed so that the end surfaces of the opposite ends of the first quartz plate unit 1 in the length direction coincide with the end surfaces of the opposite ends of the second quartz plate unit 2 in the length direction, but the end surfaces do not necessarily coincide with each other.

Figure 3A:
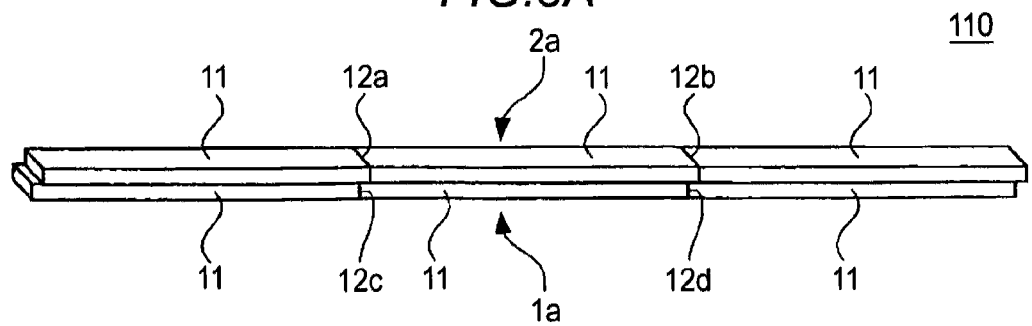
FIG. 3A is a diagram illustrating a wavelength plate which includes the same six quartz plates.

For example, in a wavelength plate 110 shown in FIG. 3A, the same three quartz plates 11 are arranged in a line in the length direction and are jointed in the same plane, to thereby form a first quartz plate unit 1a.

Further, similarly, a second quartz plate unit 2a is formed by arranging the same three quartz plates 11 in a line in the length direction and jointing them in the same plane.

The second quartz plate unit 2a is disposed to be layered on the main surface of the first quartz plate unit 1a, and is fixed thereto by an adhesive.

The second quartz plate unit 2a is disposed on the first quartz plate unit 1a to be deviated from the first quartz plate unit 1a in the length direction. Thus, joints 12c and 12d of the second quartz plate unit 2a are disposed in positions different from those of joints 12a and 12b of the first quartz plate unit 1a, and thus, it is possible to enhance the strengths of the wavelength plate 110 in the joint positions.

Even though the end surfaces of the first quartz plate unit 1a in the length direction do not coincide with the end surfaces of the second quartz plate unit 2a in the length direction by disposing the second quartz plate unit 2a in the length direction to be deviated, if the area of an effective region as the wavelength plate is sufficiently secured, such a configuration may be used.

In this case, since the wavelength plate 110 can be formed only by one type of quartz plate, it is possible to reduce the cost.

Figure 3B:
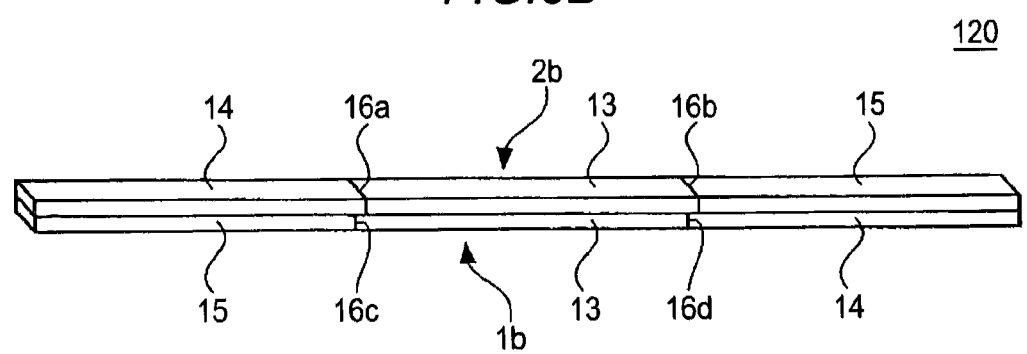
FIG. 3B is a diagram illustrating a wavelength plate which includes two sets of quartz plates having three types of lengths.

Further, a wavelength plate 120 may be configured as shown in FIG. 3B. The wavelength plate 120 includes a first quartz plate unit 1b which includes a plurality of quartz plates jointed in the same plane, and a second quartz plate unit 2b which includes a plurality of quartz plates jointed on the main surface of the first quartz plate unit 1b.

The first quartz plate unit 1b is formed by a quartz plate 13 having an approximately rectangular shape, a quartz plate 14 which is longer in length than the quartz plate 13 in the length direction, and a quartz plate 15 which is shorter in length than the quartz plate 13 in the length direction.

Further, similarly, the second quartz plate unit 2b is formed by the quartz plate 13 having an approximately rectangular shape, the quartz plate 14 which is longer in length than the quartz plate 13 in the length direction, and the quartz plate 15 which is shorter in length than the quartz plate 13 in the length direction.

Here, the quartz plate 14 in the first quartz plate unit 1b and the quartz plate 15 in the second quartz plate unit 2b are layered upon each other, and the quartz plate 15 in the first quartz plate unit 1b and the quartz plate 14 in the second quartz plate unit 2b are layered upon each other.

Further, the quartz plate 13 is disposed between the quartz plate 14 and the quartz plate 15, in both of the first quartz plate unit 1b and the second quartz plate unit 2b.

With such a configuration, it is possible to dispose joints 16c and 16d of the first quartz plate unit 1b in positions different from those of joints 16a and 16b of the second quartz plate unit 2b, and to enhance the strength of the joint positions. Further, in this case, the end surfaces of the first quartz plate unit 1b can coincide with the end surfaces of the second quartz plate unit 2b, in the length direction.

In the present embodiment, an example in which three quartz plates are disposed in the same plane and are jointed is shown, but the first quartz plate unit and the second quartz plate unit may be formed by two or four quartz plates or more.

In this case, by differentiating the joint positions of the first quartz plate unit and the joint positions of the second quartz plate unit, it is possible to secure the strength of the joint positions. Further, at this time, the length or arrangement of each quartz plate may be appropriately determined, but it is preferable that the number of types of quartz plates be as small as possible.

2. Second Embodiment

Example Used for Illumination Optical System

Figure 4:
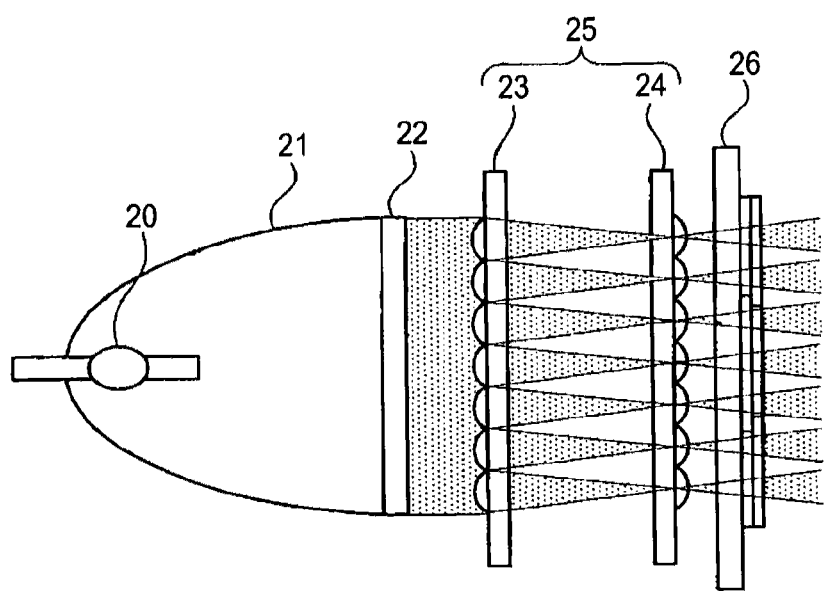
FIG. 4 is a diagram schematically illustrating a configuration of an illumination optical system according to a second embodiment of the present disclosure.

FIG. 4 is a diagram schematically illustrating a configuration of an illumination optical system 300 according to a second embodiment of the present disclosure. The illumination optical system 300 according to the present embodiment includes a light source 20 which emits light, an integrator device 25 which reduces luminance unevenness of the light emitted from the light source 20, and a polarization conversion device 26 which arranges the polarization direction of the light passed through the integrator device 25.

For example, an extra high pressure mercury lamp or the like is used as the light source 20. The light emitted from the light source 20 is reflected by a reflector 21, and exits through an explosion-proof glass 22 which covers a light exiting port of the reflector 21. The explosion-proof glass 22 is installed to protect the light source 20 from damage or the like.

With regard to the light passed through the explosion-proof glass 22, the integrator device 25 reduces the unevenness of luminance distribution in a plane perpendicular to an optical axis. In the present embodiment, the integrator device 25 is configured by a first fly-eye lens 23 and a second fly-eye lens 24.

Further, an ultraviolet cut filter or the like may be disposed between the light source 20 and the integrator device 25.

The light which passes through the integrator device 25 is converted into light having a polarization direction arranged in one direction by the polarization conversion device 26, and is emitted from the illumination optical system 300.

The polarization conversion device 200 as described in the first embodiment may be used for the polarization conversion device 26.

The polarization conversion device 200 is formed using the wavelength plate obtained by jointing the plurality of quartz plates so that their joint positions are different from each other, as described above. Thus, the heat resistance thereof is enhanced, and a large-sized device is easily achieved. Thus, in the illumination optical system 300 according to the present embodiment, for example, it is possible to simply realize an illumination which irradiates a wide range and has a large output with low cost.

Figure 5:
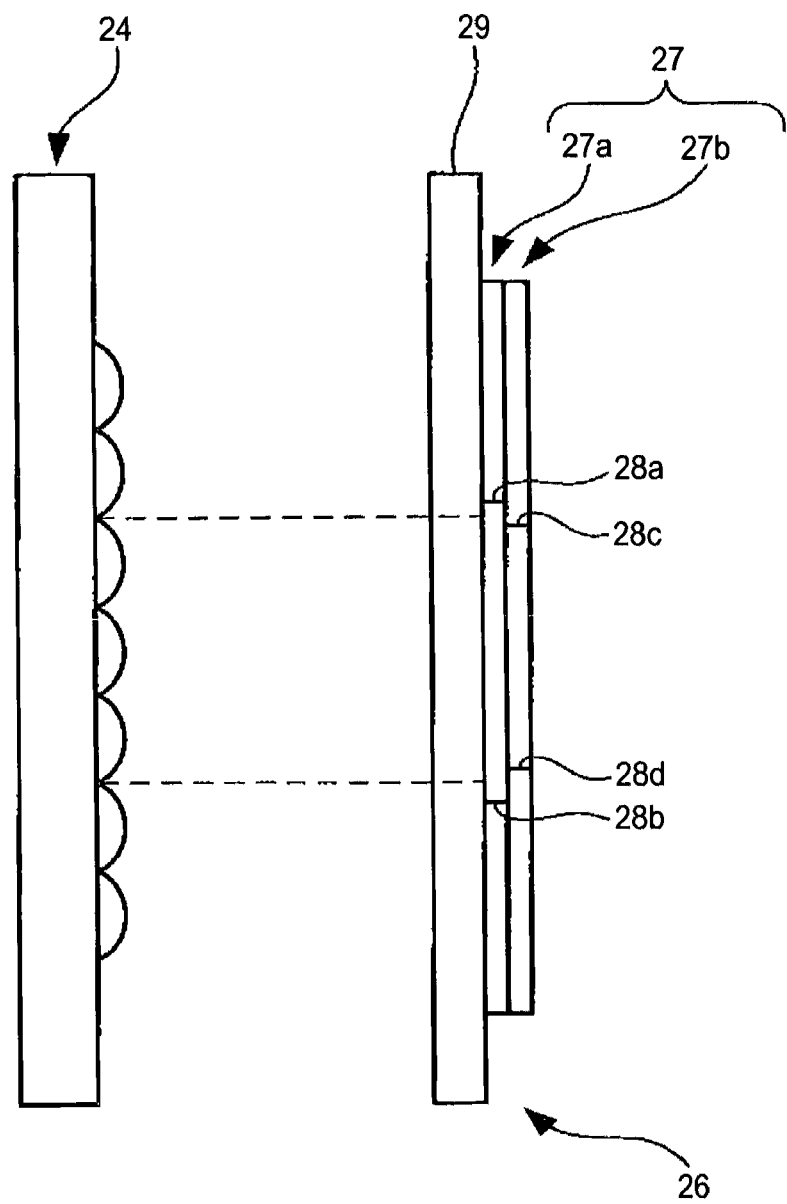
FIG. 5 is an enlarged view schematically illustrating a configuration of a second fly-eye lens and a polarization conversion device of the illumination optical system according to the second embodiment of the present disclosure.

FIG. 5 is an enlarged view schematically illustrating a configuration of the second fly-eye lens 24 and the polarization conversion device 26 of the illumination optical system 300. The polarization conversion device 26 includes a polarization splitting device 29 which splits incident light into beams of polarized light of which the polarization directions are perpendicular to each other, and a wavelength plate 27 which is disposed in the optical path of any one polarized light split by the polarization splitting device 29.

As the wavelength plate 27, the wavelength plate 100, the wavelength plate 110, the wavelength plate 120 as shown in the first embodiment, or the like may be used. Accordingly, the wavelength plate 27 includes a first quartz plate unit 27a which includes three quartz plates jointed in the same plane, and a second quartz plate unit 27b which includes three quartz plates jointed on the first quartz plate unit 27a.

Further, the positions of joints 28a and 28b of the first quartz plate 27a are different from the positions of joints 28c and 28d of the second quartz plates 27b.

In the present embodiment, when seen from the optical axis direction of the respective lenses which form the second fly-eye lens 24, a boundary of adjacent lenses is located between the joint 28a of the quartz plate of the first quartz plate 27a and the joint 28c of the quartz plate of the second quartz plate 27b.

Further, similarly, a boundary of adjacent lenses is located between the joint 28b of the quartz plate of the first quartz plate unit 27a and the joint 28d of the quartz plate of the second quartz plate unit 27b.

Figure 6:
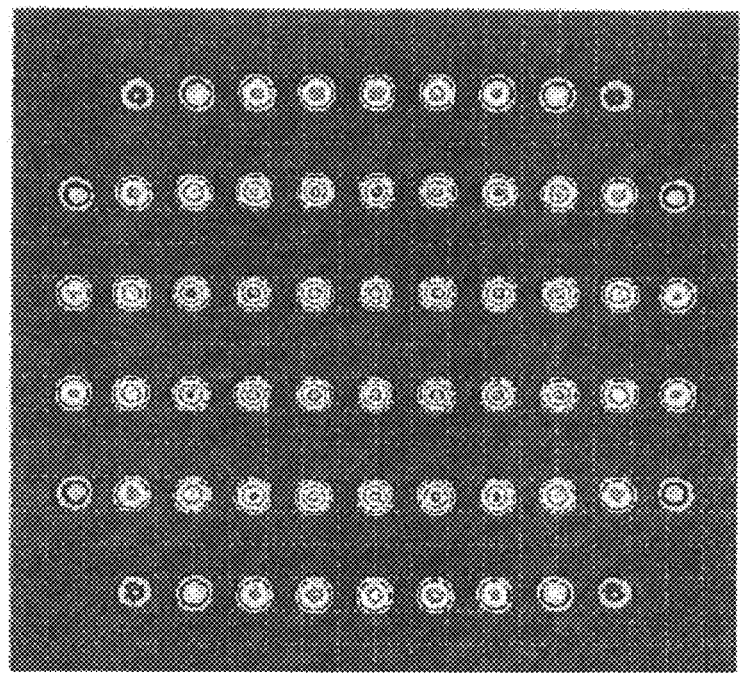
FIG. 6 is a diagram illustrating an intensity distribution of light observed in the vicinity of an arrangement position of a polarization conversion device in a case where parallel light is emitted from a light source.

FIG. 6 is a diagram illustrating an intensity distribution of light observed in the vicinity of an arrangement position of the polarization conversion device 26 in a case where the light source unit which includes the light source 20, the reflector 21 and the explosion-proof glass 22 is replaced with a light source which emits light close to parallel light. If the parallel light is emitted from the light source 20, the light focusing rate in the integrator device 25 is increased. Thus, as shown in FIG. 6, the width of each light flux after passing through the second fly-eye lens 24 is decreased, and thus, a gap occurs between the respective light fluxes.

Accordingly, as shown in FIG. 5, in the joints of the quartz plates of the first quartz plate unit 27a and the joints of the quartz plates of the second quartz plate unit 27b, it is preferable that the boundaries of the lenses in the second fly-eye lens 24 be disposed between the closest two joints.

Thus, the joints of the quartz plates are disposed between the respective light fluxes which pass through the integrator device 25, and thus, it is possible to prevent the light from being incident to the joints of the quartz plates. Accordingly, scattering, reflection or the like of light due to the joints of the quartz plates is suppressed.

Figure 7:
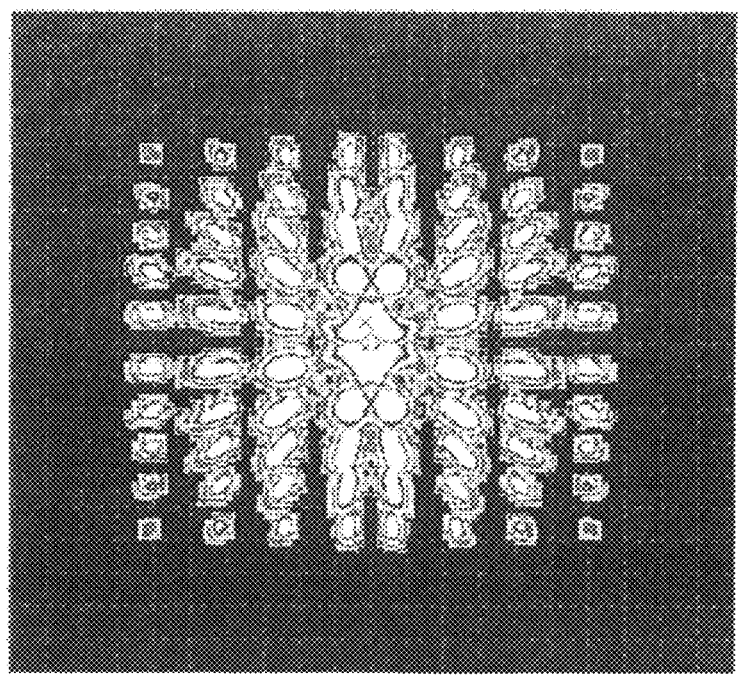
FIG. 7 is a diagram illustrating an intensity distribution of light observed in the vicinity of an arrangement position of a polarization conversion device in a case where diverging light is emitted from a light source.

On the other hand, FIG. 7 is a diagram illustrating an intensity distribution of light similarly observed in a case where diverging light is emitted from the light source 20. In a case where diverging light is emitted from the light source 20, aberration occurs in an image of the light source 20 which is imaged by the second fly-eye lens 24. Accordingly, as shown in FIG. 7, the width of each light flux which passes through the second fly-eye lens 24 is increased, and the gap between the respective light fluxes becomes small.

Figure 8:
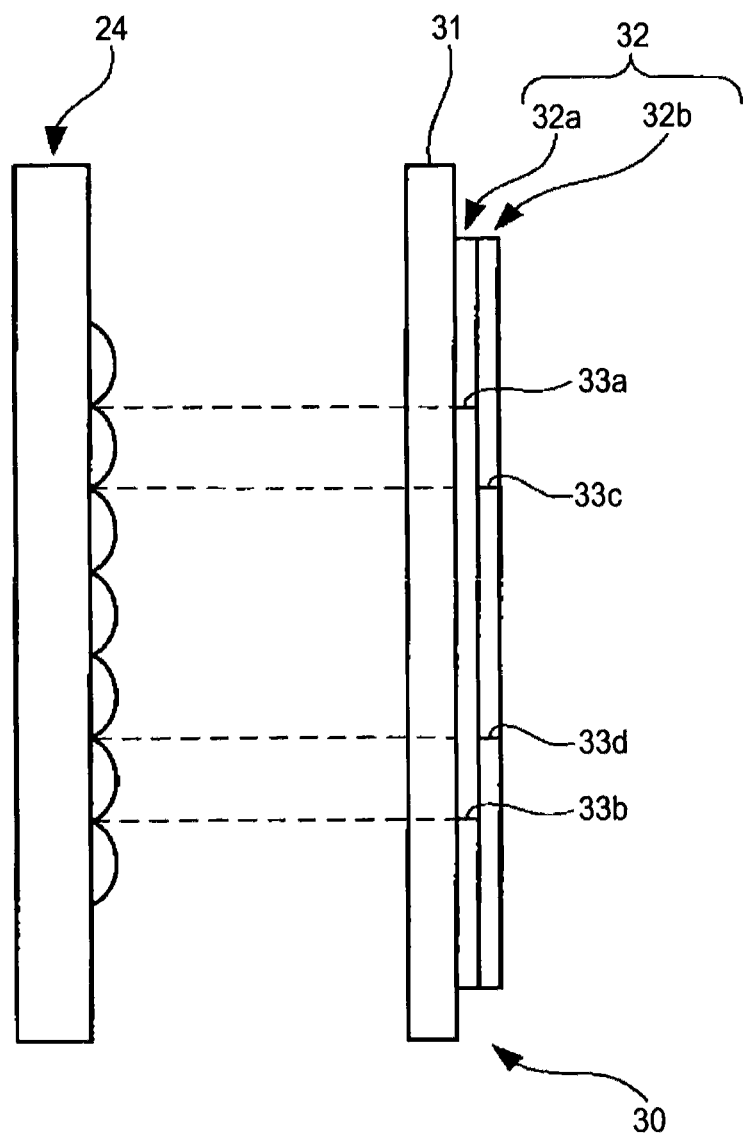
FIG. 8 is a diagram illustrating a state where joints of a quartz plate are disposed on lines extended in an optical axis direction from boundaries of respective lenses which form the second fly-eye lens.

In such a case, with such a configuration shown in FIG. 8, it is possible to effectively prevent the light from being incident to the joints of the quartz plates.

In FIG. 8, a polarization conversion device 30 includes a polarization splitting device 31 which splits incident light into beams of polarized light of which the polarization directions are perpendicular to each other, and a wavelength plate 32 which is disposed in an optical path of any one beam of polarized light split by the polarization splitting device 31. As the wavelength plate 32, the wavelength plate 100, the wavelength plate 110, the wavelength plate 120 as shown in the first embodiment, or the like may be used. Here, the wavelength plate having the same configuration as the wavelength plate 100 is shown.

The wavelength plate 32 includes a first quartz plate unit 32a which includes three quartz plates jointed in the same plane, and a second quartz plate unit 32b which includes three quartz plates jointed on the main surface of the first quartz plate unit 32a.

Further, the positions of joints 33a and 33b of the first quartz plate unit 32a are different from the positions of joints 33c and 33d of the second quartz plate unit 27b.

As shown in FIG. 8, these joints 33a, 33b, 33c and 33d are disposed on lines extended in optical axes from the boundaries of the adjacent lenses which form the second fly-eye lens 24. Further, in FIG. 8, the optical axis of each lens is perpendicular to the main surface of the first quartz plate 32a. Accordingly, the boundaries of adjacent lenses of the second fly-eye lens 24 are disposed in the normal direction of the quartz plate unit 32a from the joints 33a, 33b, 33c and 33d.

In the configuration shown in FIG. 5, two joints of the quartz plates are disposed in a gap between the respective light fluxes which pass through the second fly-eye lens 24, but in the configuration shown in FIG. 8, one joint of the quartz plates is disposed in a gap between the respective light fluxes which pass through the second fly-eye lens. Thus, it is possible to reliably prevent the light from being incident to the joints of the quartz plates, compared with the configuration shown in FIG. 5.

3. Third Embodiment

Example Used for Image Display Apparatus

By forming an image display apparatus such as a projector using the above-described illumination optical system, it is possible to provide a bright and large-sized image with low cost. FIG. 9 is a diagram schematically illustrating a configuration of an image display apparatus 400 according to a third embodiment.

The image display apparatus 400 according to the present embodiment includes an illumination optical system 40 which emits polarized light, a spectroscopic optical system 50 which disperses light emitted from the illumination optical system 40, liquid crystal panels 63, 68 and 73 which modulate the light dispersed by the spectroscopic optical system 50, respectively.

Further, the image display apparatus 400 includes a light synthesizing section 80 which synthesizes each light modulated by the liquid crystal panels 63, 68 and 73, and a projection lens 90 which projects the light synthesized by the light synthesizing section 80.

As the illumination optical system 40, the illumination optical system 300 as shown in the second embodiment (see FIG. 4) may be used. For example, white color light emitted from a light source 41 such as an extra high pressure mercury lamp is reflected by a reflector 42, and exits through an explosion-proof glass 43. In the present embodiment, a UV cut filter 44 is disposed in the illumination optical system 40, and ultraviolet light is removed from the light passed through the explosion-proof glass 43.

The light passed through the UV cut filter 44 is reduced in luminance unevenness by a first fly-eye lens 45 and a second fly-eye lens 46, and then is incident to a polarization conversion device 47. As the polarization conversion device 47, the polarization conversion device 200 as shown in the first embodiment (see FIGS. 2A to 2C) is used, and the incident light is converted to S-polarized light, for example. Further, the S-polarized light is emitted from the illumination optical system 40.

The light emitted from the illumination optical system 40 is collimated by a condenser lens 48, for example, and then is incident to the spectroscopic optical system 50.

The spectroscopic optical system 50 includes a dichroic mirror 49 which transmits, for example, blue color light among white color light from the illumination optical system 40, and reflects red color light and green color light. Further, the spectroscopic optical system 50 includes a dichroic mirror 53 which is disposed in an optical path of the light reflected by the dichroic mirror 49, reflects the green color light and transmits the red color light.

The light incident to the spectroscopic optical system 50 is firstly incident to the dichroic mirror 49, for example. The dichroic mirror 49 transmits the blue color light and reflects the red color light and the green color light.

The blue color light which passes through the dichroic mirror 49 passes through an UV absorption filter 51, to thereby cut ultraviolet light. The blue color light which passes through the UV absorption filter 51 is reflected by a mirror 52, and is incident to a condenser lens 61 while changing its path.

The blue color light focused by the condenser lens 61 is arranged into linear polarized light in a polarization direction by a polarization plate 62 on the incident side, and is incident to the liquid crystal panel 63. In a downstream stage of the liquid crystal panel 63, a polarization plate 64 on the exiting side is disposed as an analyzer, and transmits only light in a predetermined polarization direction among the light which passes through the liquid crystal panel 63.

Polarization surfaces of the polarization plate 62 on the incident side and the polarization plate 64 on the exiting side are disposed to coincide with each other, for example. Further, as the liquid crystal panel 63, for example, a twisted nematic type may be used. In this case, for example, a signal voltage for the blue color light according to image information is applied to each pixel of the liquid crystal panel 63, and a polarization direction of the blue color light which passes through each pixel is rotated according to this voltage. By passing the blue color light having a different polarization direction in each pixel through the exiting side polarization plate 64, blue color light having an intensity corresponding to the image information is obtained.

The blue color light passed through the exiting side polarization plate 64 passes through a ½ wavelength film 65 which is installed on an incident surface of the light synthesizing section 80, for example, is rotated by 90 degrees in the polarization direction, and then is incident to the light synthesizing section 80 such as a synthesis prism.

Further, the red color light and the green color light which are reflected by the dichroic mirror 49 are incident to the dichroic mirror 53. The dichroic mirror 53 reflects the green color light, and transmits the red color light.

The green color light reflected by the dichroic mirror 53 is incident to a condenser lens 66.

The green color light focused by the condenser lens 66 becomes linear polarized light by an incident side polarization plate 67, and is incident to the liquid crystal panel 68. The liquid crystal panel 68 rotates the polarization direction of the green color light which passes through each pixel according to the image information. The green color light passed through the liquid crystal panel 68 passes through an exiting side polarization plate 69 to become a green color image light having an intensity distribution according to the image information, and is incident to the light synthesizing section 80.

On the other hand, the red color light passed through the dichroic mirror 53 passes through a focusing lens 54, and then is reflected by a mirror 55.

In the optical path of the red color light reflected by the mirror 55, a wavelength selection filter 56 such as a band pass filter is disposed to pass only effective red color light in a downstream stage.

The red color light passed through the wavelength selection filter 56 passes through a focusing lens 57, and then is reflected by a mirror 58 to change its travel path.

Further, the red color light is easily diffused due to its long optical path compared with the green color light or the blue color light, and thus, the focusing lenses 54 and 57 converge the red color light.

The red color light reflected by the mirror 58 is focused by a condenser lens 71, and then is incident to an incident side polarization plate 72. By passing through the incident side polarization plate 72, the red color light becomes linear polarized light, and is incident to the liquid crystal panel 73.

A voltage signal based on the image information is applied to each pixel, in the liquid crystal panel 73. Further, the polarization direction of the passed red color light is rotated according to the voltage signal. The red color light passed through the liquid crystal panel 73 is incident to an exiting side polarization plate 74 to become red color image light having an intensity distribution according to the image information.

Here, a transmissive liquid crystal panel is exemplified as a modulator which modulates light according to the image information, but the modulation may be performed by different techniques using a reflection type liquid crystal panel, a GLV (Grating Light Valve) or the like.

The red color light passed through the exiting side polarization plate 74 is rotated by 90 degrees in the polarization direction by a ½ wavelength film 75 which is installed on the incident surface of the light synthesizing section 80 such as a synthesis prism, and then is incident to the light synthesizing section 80.

The light synthesizing section 80 transmits the green color light which is the p-polarized light and reflects the blue color light and the red color light which are the s-polarized light, to thereby synthesize the red color light, the green color light and the blue color light in the same optical path. Further, the synthesized light exiting from the synthesis prism is enlarged and projected on a screen, for example, by a projection lens 90.

In this way, in the image display apparatus 400 according to the present embodiment, the same illumination optical system 40 as the illumination optical system 300 as shown in the second embodiment is used. Accordingly, the wavelength plate of the polarization conversion device 47 includes the first quartz plate unit which includes the plurality of quartz plates jointed in the same plane, and the second quartz plate unit which is disposed on the main surface of the first quartz plate unit and includes the plurality of jointed quartz plates. Since the positions of the joints of the first quartz plate unit are different from the positions of the joints of the second quartz plate unit, as described above, the wavelength plate is superior in heat resistance, and a large sized wavelength plate is obtained with low cost.

By using such a wavelength plate in the illumination optical system 40, even though the light source 41 is enlarged, separation of the wavelength plate due to the heat of the light is suppressed. Further, since a large-sized wavelength plate is easily achieved, it is possible to cope with an illumination which irradiates a wide range.

Thus, in the image display apparatus according to the present embodiment, it is possible to realize a large screen display with low cost.

Hereinbefore, the wavelength plate, the polarization conversion device using the same, the illumination optical system, and the image display apparatus have been described. This technology is not limited to the above-described embodiments, and a variety of modifications may be made in a range without departing from the spirit of the present disclosure.

It should be understood by those skilled in the art that various modifications, combinations, sub-combinations and alterations may occur depending on design requirements and other factors insofar as they are within the scope of the appended claims or the equivalents thereof.

What is claimed is:

1. Optical apparatus comprising:
   an integrator device which reduces illuminance unevenness of light received from a light source and includes a plurality of lenses;
   a polarization conversion device which is disposed in an optical path of light which passes through the integrator device, and includes a wavelength plate comprising:
   a first quartz plate unit including a plurality of quartz plates which have main surfaces disposed in the same plane, at least the first and second quartz plates of the first unit being jointed with each other end-to-end; and
   a second quartz plate unit including a plurality of quartz plates which have main surfaces disposed on a main surface of the first quartz plate unit, at least the first and second quartz plates of the second unit being jointed with each other end-to-end in a position different from the end-to-end joint position of the first quartz plate unit,
   wherein a boundary of adjacent lenses in the plurality of lenses of the integrator device is disposed between two closest joints among joints of the first quartz plate unit and the second quartz plate unit when seen from an optical axis direction of the integrator device.

2. The optical apparatus according to claim 1,
   wherein the quartz plates which form the first quartz plate unit exhibit a length that differs from the length of the quartz plates which form the second quartz plate unit.

3. The wavelength plate optical apparatus according to claim 2,
   wherein all the plurality of quartz plates which form the second quartz plate unit have the same length.

4. Optical apparatus according to claim 3,
   wherein, in the second quartz plate unit, a quartz plate which is larger than the quartz plates which form the first quartz plate unit, and a quartz plate which is smaller than the quartz plates which form the first quartz plate unit are alternately jointed with each other.

5. An illumination optical system comprising:
   a light source;
   an integrator device which reduces illuminance unevenness of light emitted from the light source; and
   a polarization conversion device which is disposed in an optical path of light which passes through the integrator device, and includes a polarization splitting device which splits incident light into p-polarized light and s-polarized light and a wavelength plate which is disposed in an optical path of any one polarized light split by the polarization splitting device,
   wherein the wavelength plate of the polarization conversion device includes a first quartz plate unit including a plurality of quartz plates which have main surfaces disposed in the same plane and are jointed with each; and a second quartz plate unit including a plurality of quartz plates which have main surfaces disposed on a main surface of the first quartz plate unit and are jointed with each other in a position different from a joint position of the first quartz plate unit,
   wherein a boundary of adjacent lenses in a plurality of lenses which form the integrator device is disposed between two closest joints among joints of the first quartz plate unit and the second quartz plate unit when seen from an optical axis direction of the integrator device.

6. A illumination optical system comprising:
a light source;
an integrator device which reduces illuminance unevenness of light emitted from the light source; and
a polarization conversion device which is disposed in an optical path of light which passes through the integrator device, and includes a polarization splitting device which splits incident light into p-polarized light and s-polarized light and a wavelength plate which is disposed in an optical path of any one polarized light split by the polarization splitting device,
wherein the wavelength plate of the polarization conversion device includes a first quartz plate unit including a plurality of quartz plates which have main surfaces disposed in the same plane and are jointed with each; and a second quartz plate unit including a plurality of quartz plates which have main surfaces disposed on a main surface of the first quartz plate unit and are jointed with each other in a position different from a joint position of the first quartz plate unit, and
wherein the joints of the first quartz plate unit and the second quartz plate unit are disposed in a line extended in the optical axis direction from a boundary of adjacent lenses in the plurality of lenses which form the integrator device.

7. An image display apparatus comprising:
an illumination optical system including a light source, an integrator device which reduces illuminance unevenness of light emitted from the light source and includes a plurality of lenses, and a polarization conversion device which is disposed in an optical path of light which passes through the integrator device and includes a polarization splitting device which splits incident light into p-polarized light and s-polarized light and a wavelength plate which is disposed in an optical path of any one polarized light split by the polarization splitting device;
a spectroscopic optical system which disperses light emitted from the illumination optical system;
a liquid crystal panel which modulates each dispersed light;
a light synthesizing section which synthesizes the light modulated by the liquid crystal panel; and
a lens which projects the light synthesized by the light synthesizing section,
wherein the wavelength plate of the illumination optical system includes a first quartz plate unit including a plurality of quartz plates which have main surfaces disposed in the same plane, at least the first and second quartz plates of the first unit being jointed with each other end-to-end; and a second quartz plate unit including a plurality of quartz plates which have main surfaces disposed on a main surface of the first quartz plate unit, at least the first and second quartz plates of the second unit being jointed with each other end-to-end in a position different from the end-to-end joint position of the first quartz plate unit, and
wherein the joints of the first quartz plate unit and the second quartz plate unit are disposed in a line extended in the optical axis direction from a boundary of adjacent lenses in the plurality of lenses of the integrator device.

* * * * *